(12) United States Patent
Ott

(10) Patent No.: US 7,600,443 B2
(45) Date of Patent: Oct. 13, 2009

(54) VERTICALLY ADJUSTABLE, MOUNTABLE SPEED SENSOR

(75) Inventor: Harald Ott, Freiberg Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/577,641

(22) PCT Filed: Jul. 27, 2006

(86) PCT No.: PCT/EP2006/064722

§ 371 (c)(1),
(2), (4) Date: Apr. 20, 2007

(87) PCT Pub. No.: WO2007/023058

PCT Pub. Date: May 1, 2007

(65) Prior Publication Data

US 2009/0064779 A1 Mar. 12, 2009

(30) Foreign Application Priority Data

Aug. 25, 2005 (DE) ............... 10 2005 040 169

(51) Int. Cl.
*G01P 1/00* (2006.01)
*G01P 1/02* (2006.01)
*G01D 11/00* (2006.01)
*G01P 21/00* (2006.01)

(52) U.S. Cl. .......................... 73/866.5; 73/493
(58) Field of Classification Search ............ 73/493–494, 73/866.5
See application file for complete search history.

(56) References Cited

U.S. PATENT DOCUMENTS

| | | | |
|---|---|---|---|
| 5,251,087 A | 10/1993 | Sakashita et al. | |
| 6,112,594 A * | 9/2000 | Brinks et al. | ................ 73/493 |
| 6,523,425 B1 | 2/2003 | Kubik | |
| 6,861,953 B2 * | 3/2005 | Deconinck et al. | ....... 340/568.2 |
| 6,906,700 B1 * | 6/2005 | Armstrong | ................ 345/161 |
| 7,123,240 B2 * | 10/2006 | Kemppinen | ................ 345/161 |
| 7,373,826 B2 * | 5/2008 | Weber et al. | ................ 73/700 |
| 2004/0109623 A1 | 6/2004 | Ulrici et al. | |

FOREIGN PATENT DOCUMENTS

| | | |
|---|---|---|
| DE | 44 41 889 | 6/1995 |
| DE | 20 2004 002 348 | 6/2004 |
| DE | 103 48 641 | 5/2005 |
| DE | 103 48 651 | 6/2005 |
| EP | 0 547 935 | 6/1993 |
| FR | 1 388 736 | 2/2004 |
| JP | 08278780 | 10/1996 |

* cited by examiner

*Primary Examiner*—Thomas P Noland
(74) *Attorney, Agent, or Firm*—Michael J. Striker

(57) ABSTRACT

The invention relates to a method for mounting sensors (40), e.g. rpm sensors, on a support plate (10) of a control module. The method comprises the following steps: a cylindrical sensor (40) is oriented and is inserted into a tubular sensor dome (18) of the support plate (10) in the mounting direction (56). An assembly dimension (88) for the sensor is then set as the distance between the face of the sensor and a top side (16) of the support plate (10). A positive connection between the sensor (40) and the sensor dome (18) is established by introducing a fixing material (68) into a hollow space (64), and a positive or a bonding sensor contact (76) between the sensor (40) and contacts (70) located at the support plate end is created when the sensor (40) is inserted into the sensor dome (18).

12 Claims, 7 Drawing Sheets

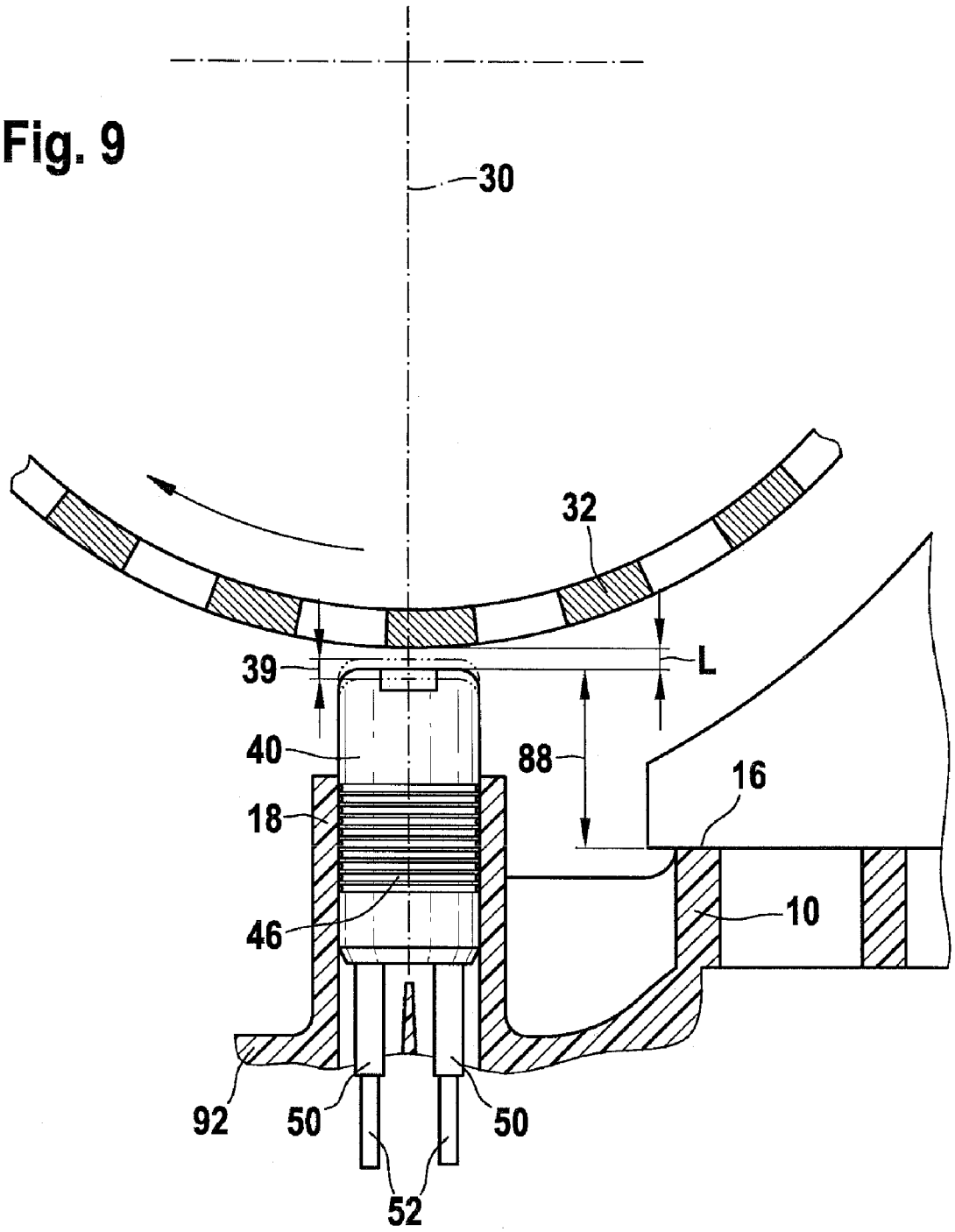

VERTICALLY ADJUSTABLE, MOUNTABLE SPEED SENSOR

Figure 1:
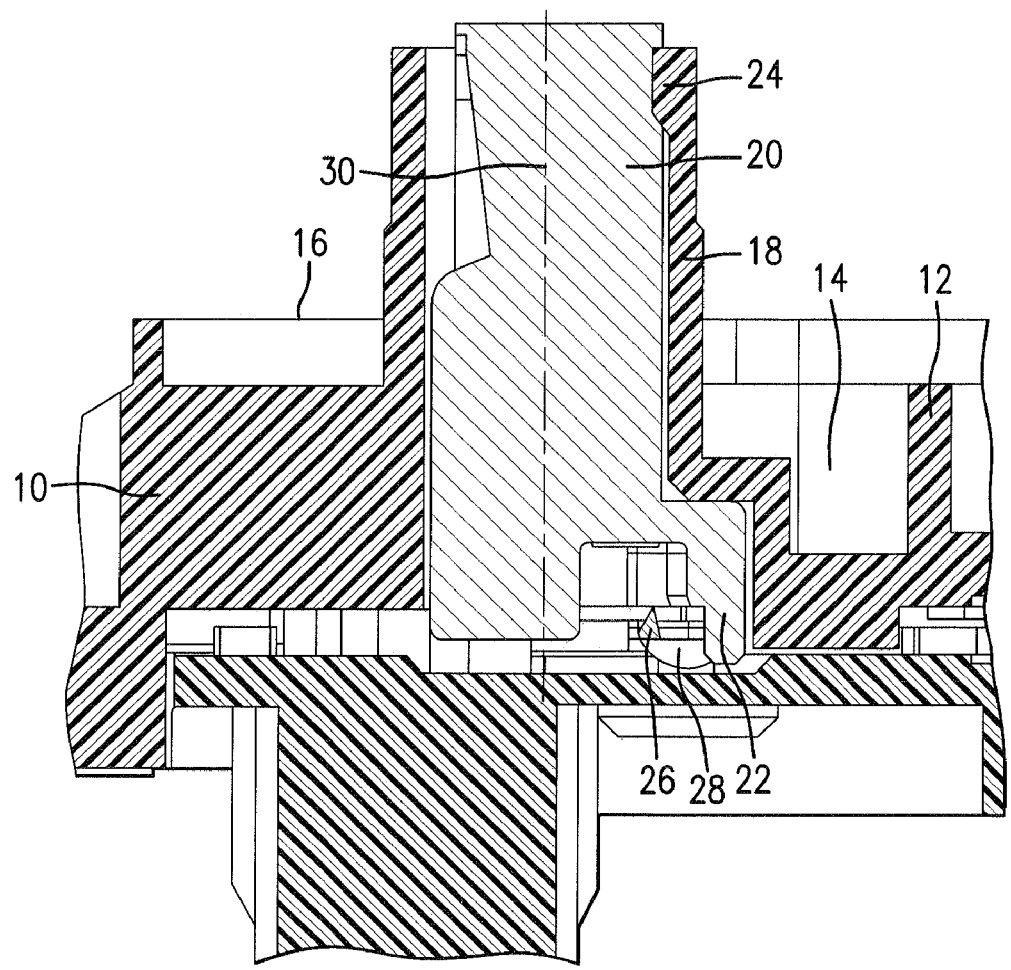

The present invention relates to a rotation speed sensor that can be mounted in a vertically adjustable manner, which can in particular be used in transmission control modules in the automotive field as a rotation speed sensor for detecting the drive shaft speed or output shaft speed.

PRIOR ART

DE 103 48 651 A1 has disclosed an installation unit for a motor vehicle, in particular intended for controlling a transmission of the motor vehicle. The installation unit includes a support piece, electrical and/or electronic components situated on the support piece, and electrical connecting elements that are situated on the support piece and are for electrically connecting the electrical and/or electronic components. The electrical connecting elements are embodied in the form of at least one FFC flexible flat cable that contains at least two metal band conductors extending parallel to each other. The metal band conductors extending parallel to each other are made of roller-pressed metal wires that are encased in a flat, strip-shaped insulation band.

The at least one FFC flexible flat cable is mounted on the support piece by means of one-piece or multiple-piece plastic parts. The ends of the metal band conductors of the at least one FFC flexible flat cable protrude from the insulation casing of the FFC flexible flat cable on at least one end of a connecting section and are secured in a trough-shaped plastic part provided with a recess. The recess of the trough-shaped plastic part is filled with an insulating filling. The plastic part has at least one first plastic element that is fastened to the FFC flexible flat cable through extrusion coating of the FFC flexible flat cable with plastic. The plastic part also has at least one second plastic element that can be attached to the first plastic element and that is fastened to the support piece, preferably by means of stems provided on the plastic part, which are guided through openings in the support piece and then deformed in place.

The installation unit includes at least one subassembly that is embodied as a multipoint connector with plug contacts. Transmission control modules currently in use in the automotive field have sensors of various lengths installed in them, for example for detecting the output shaft speed. Usually the sensors are pressed-fitted into a correspondingly configured sensor dome of a support plate, with the sensor centered in it. The fixing of the sensor occurs on the opposite end, at the sensor base, where the sensor is attached to the support plate by means of two hot caulks. The electrical contacting in relation to the transmission control module occurs by means of pressed screens that are attached to each other by means of laser welding. The disadvantage of the designs known from the prior art and the design according to DE 103 48 651 A1 is the fact that the required sensor elements, which are of various lengths, require the use of separate tool sets to manufacture the sensor, which increases the amount of technical production effort that must be expended.

In the designs known from the prior art, care is taken to minimize the size of the air gap between the sensor head and a trigger wheel, for example. But this air gap is tolerance-encumbered, the overall tolerance being composed of the tolerance of the sensor position, the tolerance of the support plate, and an installation tolerance. Due to the above-outlined additive tolerance chain based on the desired air gap, occasionally a sensor head is situated an impermissibly large distance away from the trigger wheel, which has disadvantages from a technical signal detection standpoint. For this reason, efforts are made to minimize tolerances as much as possible in order to assure a well-defined air gap between a sensor head and the trigger wheel, for example, scanned by it.

DESCRIPTION OF THE INVENTION

The present invention proposes producing the sensors of varying lengths, which are required depending on the type of transmission control module, by means of variable press-fitting and subsequent fixing of a modular sensor element. This achieves a simple, inexpensive manufacture of a transmission control module since it requires only one sensor tool set and only one assembly line for sensors. In addition, it enables implementation of an extremely simple sensor installation device in the module assembly. In particular, the use of a modular sensor element offers the possibility of a very precise adjustment of the installation height of the sensor module during installation in the transmission control module. The assembly precision is particularly advantageous with regard to a small air gap and is accompanied by functional advantages. In the design according to the invention, the assembly dimension can be adjusted very precisely during installation. In particular, it is possible to avoid the tolerance chain comprised of the support plate, sensor length, and installation tolerance so that the actual air gap between the sensor head and a trigger wheel, for example, of a motor vehicle transmission can be adjusted with a significantly greater degree of precision. From a technical signal detection standpoint, it is desirable to achieve the smallest possible air gap L between the circumference surface of the trigger wheel and the position of the sensor head of the sensor element. With the design according to the invention, the sensor assembly dimension that the method according to the invention achieves during installation is highly precise. It is also advantageous that the installation method according to the invention permits an infinitely variable installation of a sensor, which detects drive shaft speeds or output shaft speeds, in the sensor dome of a support plate, for example of a transmission control module.

DRAWINGS

The invention will be described below in conjunction with the drawings.

Figure 2:
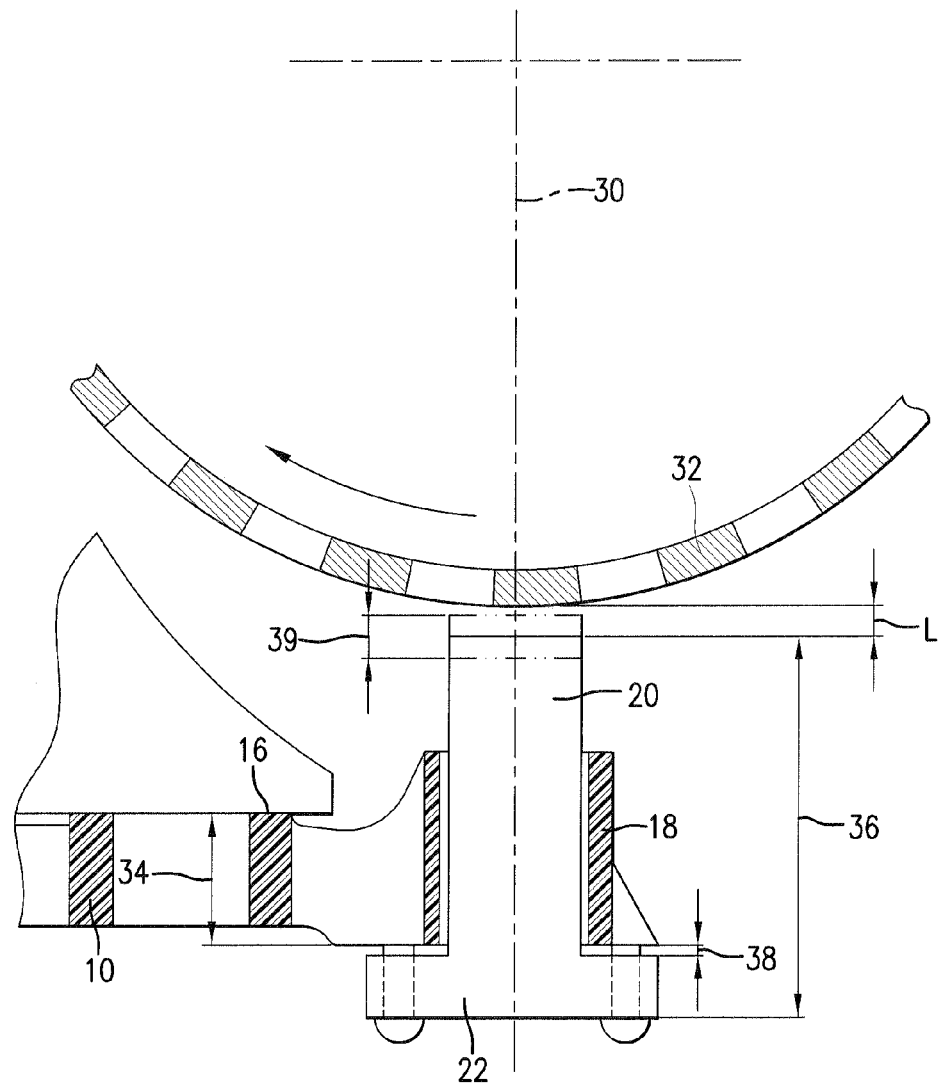
Figure 3:
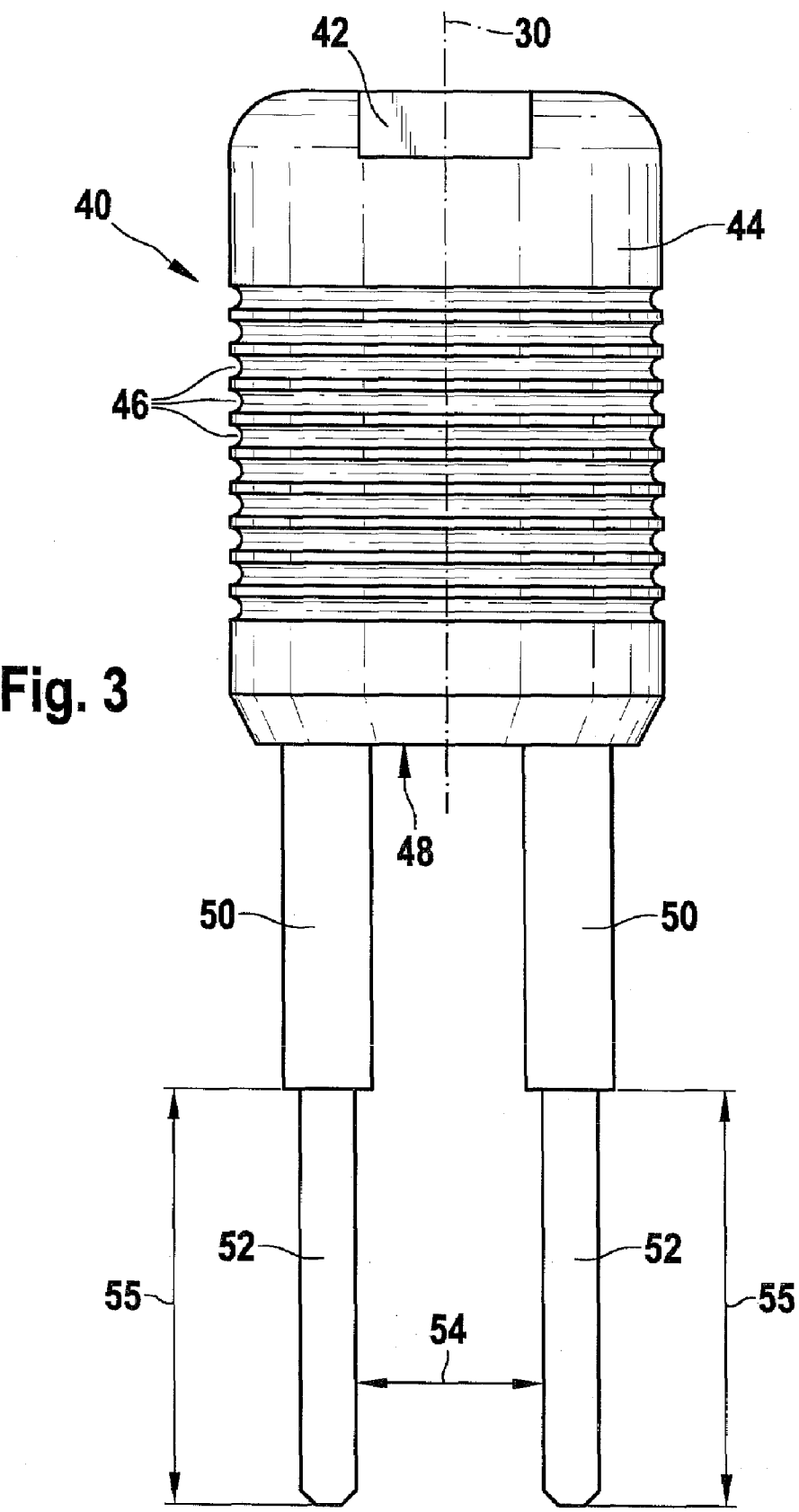
Figure 4:
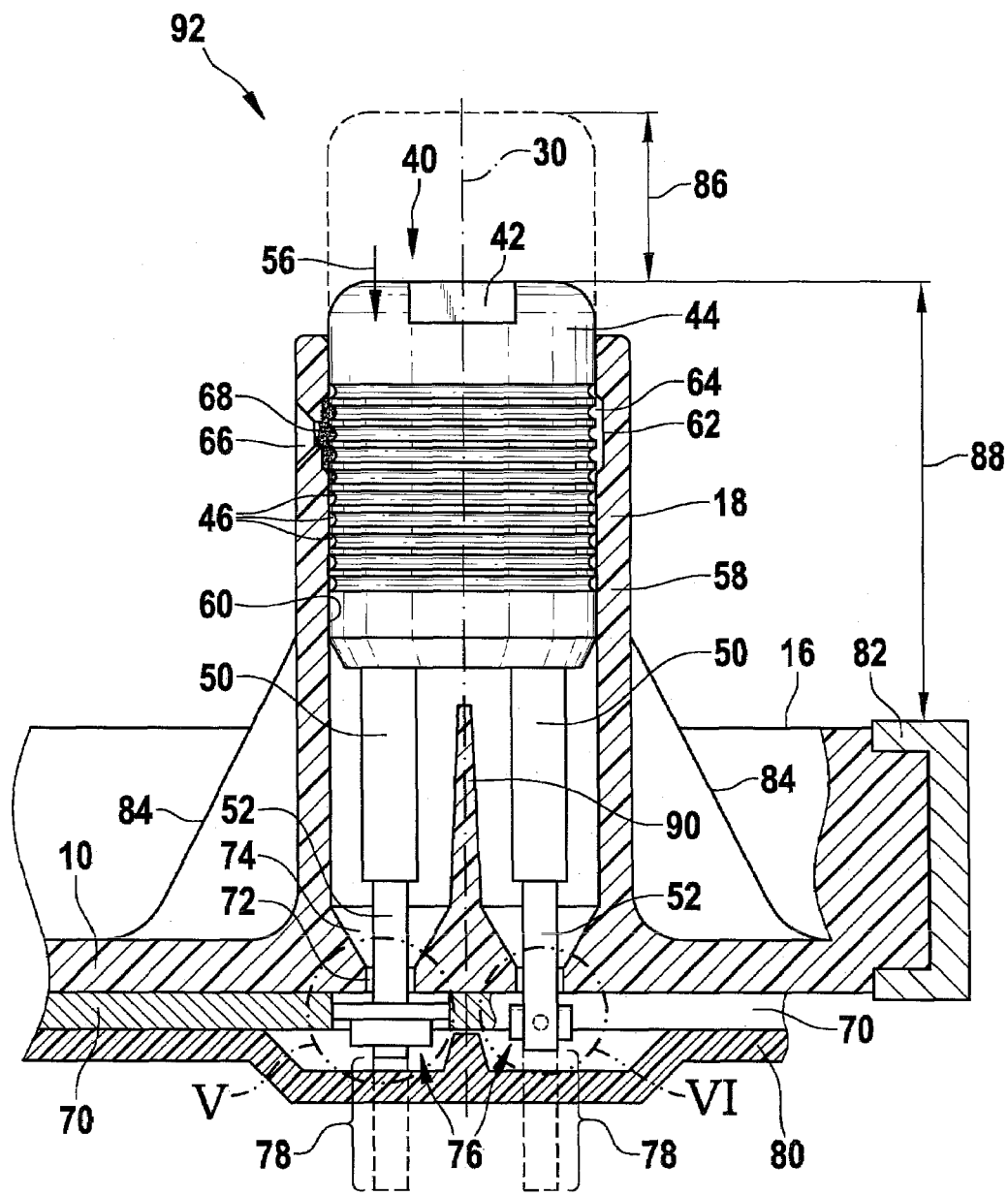
Figure 5:
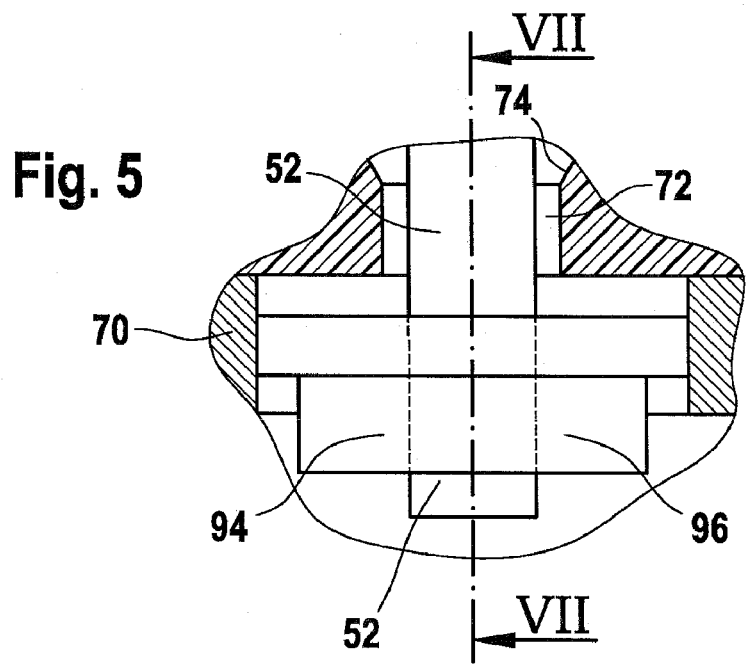
Figure 6:
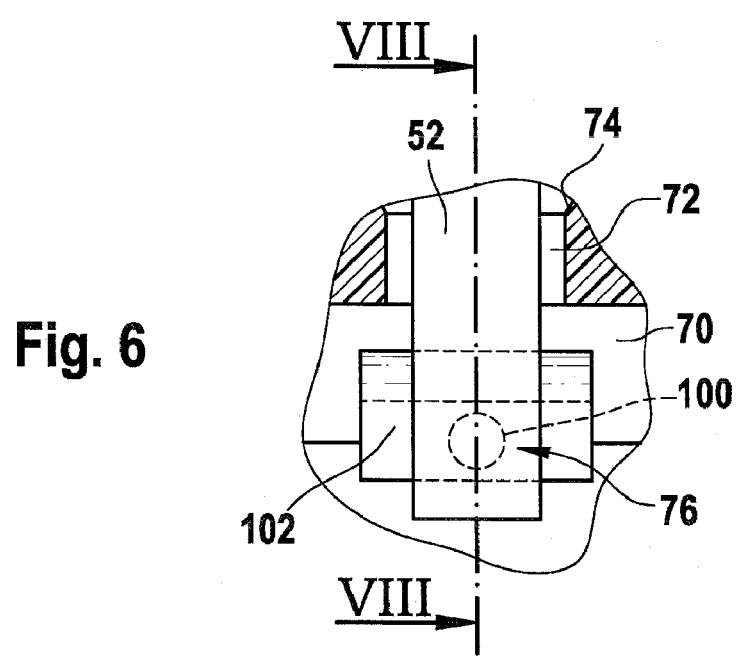
Figure 7:
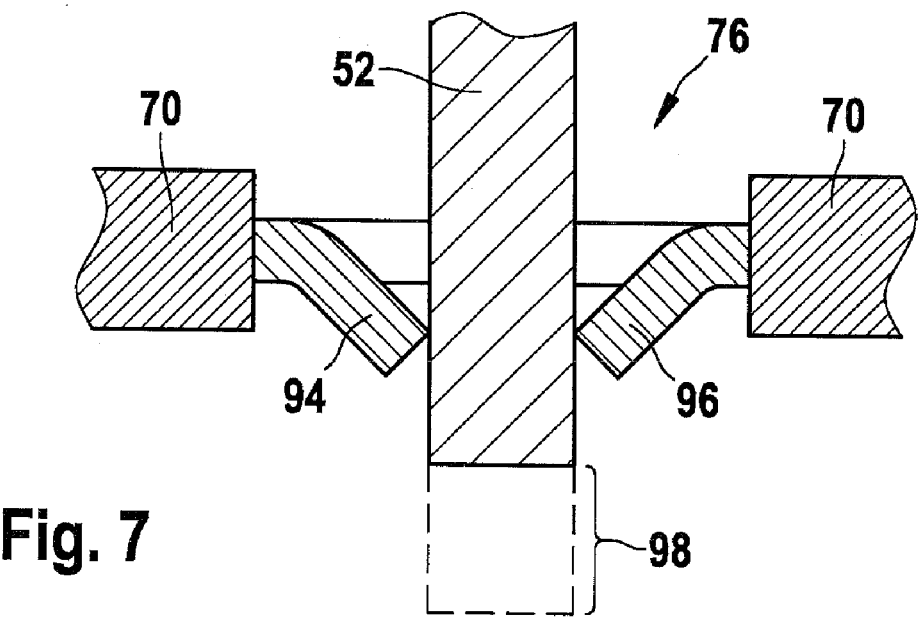
Figure 8:
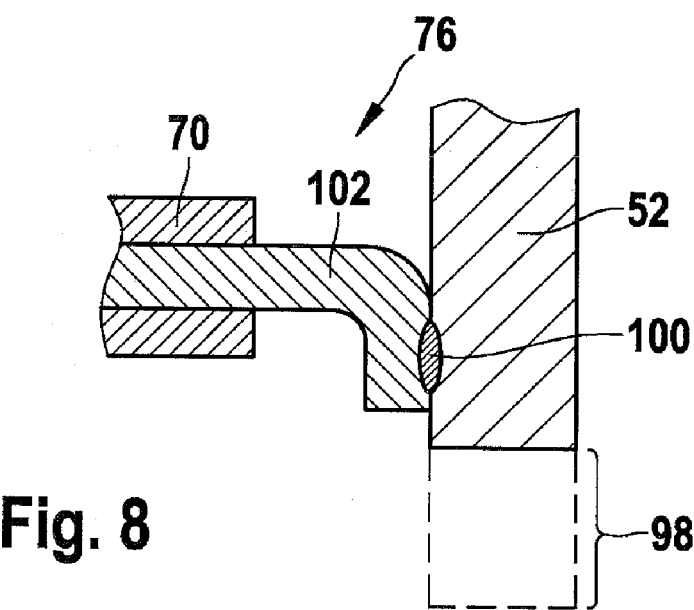

FIG. 1 shows a sensor attachment of a sensor element to a support plate of a transmission control module according to the prior art, FIG. 2 shows the tolerance chain resulting from the arrangement according to FIG. 1, FIG. 3 shows the modular sensor element according to the invention, with pressed screen extrusion coating and exposed regions of the pressed screens, FIG. 4 shows a sensor element mounted in a sensor dome of a support plate according to the depiction in FIG. 3, FIG. 5 shows a first exemplary embodiment of a contact between the support plate and the sensor element according to the depiction in FIG. 4, FIG. 6 another exemplary embodiment of a possible embodiment of a contact between the support plate and the sensor element according to FIG. 4, FIG. 7 shows a section through the contact according to the section line VII-VII from FIG. 6, FIG. 8 shows a section through the possible embodiment of a contact between the sensor element and support plate according to the section line VIII-VIII in FIG. 6, and FIG. 9 shows the tolerance chain resulting from the design according to the invention.

EXEMPLARY EMBODIMENTS

FIG. 1 shows a sensor attachment of a sensor element to a support plate according to the prior art.

A support plate 10 of a transmission control module for motor vehicle transmissions includes a multitude of recesses 14 that are separated from one another by intermediate pieces 12. The support plate 10 contains a sensor dome 18 in which a sensor 20 is mounted. The symmetry axis of the sensor dome 18 is labeled with the reference numeral 30. Centering lugs 24 serve to center the sensor 20 in the sensor dome 18, which extends above the top surface 16 of the support plate 10. At a sensor contact 26, a contact is produced, for example by means of laser welding, between the sensor 20 situated on the sensor base 22 and the pressed screens extending inside the support plate 10. The sensor 20 is mounted in position by means of a hot caulking, for example, at the sensor base 22, as indicated by the reference numeral 28.

FIG. 2 shows the tolerance chain of a sensor arrangement known from the prior art. An air gap L by in which a sensor element situated on the end surface of the sensor 20 is spaced apart from the circumference of a trigger wheel 32, is tolerance-encumbered. In the design shown in FIG. 2, the support plate 10 is encumbered with a tolerance 34, as is also the case with the sensor length 36 of the sensor 20 and the installation tolerance 38 produced upon installation. This yields an overall tolerance 39 of the transmission control module that depends on at least three individual tolerances. Because of the unfavorably additive tolerances 34, 36, and 38, the sensor 20 can be spaced far enough away from the circumference of the trigger wheel 32 to impair the signal detection between the trigger wheel 32 and the sensor 20. This must be structurally avoided as much as possible. The transmission-induced tolerances, which likewise influence the air gap L, are not considered in detail below.

FIG. 3 shows the sensor module according to the invention, which can be used, for example, as a sensor for detecting the drive shaft speed or output shaft speed.

The rotation speed sensor 40 shown in FIG. 3 has a surface 42 on its head, at which the rotation speed sensor 40 can be grasped and oriented by an installation tool. The surface 42 is embodied on a sensor casing 44 of the rotation speed sensor 40 and, in a longer region extending in the axial direction, its circumference surface is provided with flutes 46. The sensor casing 44 is provided with a filling 48 composed of a sealing compound. The sensor casing 44 is adjoined by pressed screens 52 that are embodied with a standardized excess length. The regions of the pressed screens 52 directly adjoining the sensor casing 44 are enclosed by a pressed screen extrusion coating 50; the pressed screens 52 are attached to the sensor casing 44 of the rotation speed sensor 40, spaced apart from each other by a distance 54. The pressed screens 52 also have a freely extending length labeled with the reference numeral 55, which serves to produce an electrical contact with the support plate 10 of a transmission control module, for example.

FIG. 4 shows a sensor module according to the depiction in FIG. 3, in the state in which it is mounted in a sensor dome of a support plate.

FIG. 4 shows that the rotation speed sensor 40 according to FIG. 3 is slid into the sensor dome 18 in the installation direction 56. An insertion of the rotation speed sensor 40 into the sensor dome 18 occurs in accordance with a desired assembly dimension 88 of the rotation speed sensor 40, which is measured between the top surface 16 of the support plate 10 and the end surface of the rotation speed sensor 40. Between an inside 60 of the wall 58 of the sensor dome 18 and the circumference surface of the sensor casing 44 of the rotation speed sensor 40, there is a slight press-fit that fixes the rotation speed sensor 40 in the sensor dome 18.

Before the insertion into the opening of the sensor dome 18, the rotation speed sensor 40 is first oriented on the surface 42 so that the pressed screens 52 are not damaged upon insertion into openings 72 in the support plate 10.

The sensor dome 18 can be reinforced by rib-shaped supports 84 that can be injection-molded onto the support plate 10. The sensor dome 18 is part of the support plate 10, which is preferably manufactured as an injection-molded plastic component. After being press-fitted into the sensor dome 18, the rotation speed sensor 40 is fixed in position by the press-fit produced between the circumference surface of the sensor casing 44 and the inside 60 of the wall 58. The final fixing is produced by injecting a fixing compound such as adhesive, hot-melt glue, or easily flowing plastic injection-molding compound into an injection opening 66 that is provided in the wall 58 of the sensor dome 18. During the injection process, the fixing compound 68 shown only on one side in the depiction in FIG. 3 fills the cavity 64 delimited by the undercut 62 and flows between the flutes 46 embodied on the circumference surface of the sensor casing 44. The undercut 62 in the sensor dome 18 makes it possible to implement a form-locked engagement of the rotation speed sensor 40 with the sensor dome 18. The diameter of the undercut 62 is selected so that it can be pushed out of the injection mold by force.

During insertion of the rotation speed sensor 40 in to the sensor dome 18, the freely extending ends of the pressed screens 52 are first centered by insertion bevels 74 before the freely extending pressed screens 52 travel into the openings 72 of the support plate 10. As soon as the freely extending ends of the pressed screens 52 have passed through the openings 72, an electrical contact 76 is produced between the free ends of the pressed screens 72 and a pressed screen 70 that is injection-molded or inserted into the support plate 10. The electrical contact 76 is shown in detail in FIGS. 4 through 7.

Between the openings 72, which can be provided in the support plate 10 of a transmission control module, for example, there is a rib-shaped dividing piece 90 that prevents short circuits between the contacts.

It is clear from FIG. 4 that after the production of the electrical contact 76 between the pressed screens 52 of the rotation speed sensor 40 and the support plate pressed screen 70, an excess length 78 of pressed screen is left over on the freely extending ends of the pressed screen 52. The excess length 78 of pressed screen in FIG. 4 depends on the sensor assembly dimension 88. The excess length 78 of pressed screen can be simply cut to length after the electrical contact 76 is produced. Then, the electrical contact 76 between the support plate pressed screen 70 and the freely protruding ends of the pressed screens 52 can optionally be covered by a covering plate 80 in order to protect the produced electrical contacts 76 from moisture, corrosion, and particulate deposits.

For the sake of completeness, it should be mentioned that the support plate 10, for example of a transmission control module, can be provided with several sensor domes 18 as well as with a number of fastening bushings 82 that are indicated in the depiction in FIG. 3. It is also clear from FIG. 3 that depending on the respective individual sensor assembly dimension 88, due to the excess length at the free ends of the pressed screens 52, a protrusion dimension 86 of the rotation speed sensor 40 is produced, which is an indication of the installation variability with regard to the installation height of the rotation speed sensor 40 in the sensor dome 18. In accordance with this dimension 86, the circumference of the sensor casing 44 is provided with flutes 46 so that the rotation speed sensor 40 in the sensor dome 18 can be fixed in an integrally joined fashion or by means of a form-locked engagement at any installation height within the dimension 86 by injecting a fixing compound 68 through the injection opening 66.

FIG. 5 shows an insulation displacement contact between the free ends of the pressed screens and the support plate pressed screen.

During insertion of the pressed screens 52, the insertion bevels 74 provided at the top of the openings 72 in the support plate 10 center the freely extending ends of the pressed screens 52. With further insertion of the pressed screens 52 during installation of the rotation speed sensor 40 in the sensor dome 18, contact tabs 94, 96 on the support plate pressed screen 70 are spread apart and an insulation displacement contact 76 is produced. Because of the prestressing of the material of the pressed screen, the first and second contact tabs 94, 96 rest against the pressed screens 52, as shown in the sectional depiction in FIG. 7 according to the section line VII-VII in FIG. 5. After the contact 76 is produced—as shown in FIG. 7—the pressed screen material to be cut to length (depicted with dashed lines in FIG. 7, see reference numeral 98) can be cut off and the cover 80 shown in FIG. 4 can be attached to the underside of the support plate 10 so that it covers the above-described contacts 76 between the rotation speed sensor 40 and the support plate 10.

FIGS. 6 and 8 show another possible embodiment of an electrical contact 76 between the free ends of the pressed screens 52 and the pressed screen 70 mounted in the carrier plate 10.

FIG. 6 shows that the free ends of the pressed screens 52 are likewise centered by the insertion bevels 74 before insertion into the openings 72 of the support plate 10. Further insertion of the free ends of the pressed screens 52 then occurs in such a way that they are slid in until the free ends of the pressed screens 52 are situated opposite an unbent end 102 of the support plate pressed screen 70. The bent end 102 of the support plate pressed screen 70 is brought into congruence with the free end of the pressed screen 52 and an integrally joined connection 100 is then produced, for example by means of resistance welding or laser welding.

FIG. 8 shows a sectional depiction of the integrally joined connection 100 according to the section line VIII-VIII in FIG. 6. FIG. 7 also shows that after production of the integrally joined connection 100 between the bent end 102 of the support plate pressed screen 70 and the free end of the pressed screen 52 of the rotation speed sensor 40, the pressed screen material 98 to be cut to length—depicted with dashed lines here—can be cut off below the integrally joined connection 100. After the pressed screen material 98 to be cut to length is cut off, the electrical contact 76 can also be covered with the covering plate mounted to the underside of the support plate 10, as shown in FIG. 3, and thus protected against corrosion, moisture, and particulate deposits.

The sensor module according to the invention, which can be used, for example, as an output shaft rotation speed sensor 40 in a transmission control module, advantageously makes it possible to maintain individual sensor assembly dimensions 88. The sensor casing 44 of the rotation speed sensor 40 in FIGS. 3 and 4 has flutes 46 in a region of its circumference, which provide a corresponding variability 86 with regard to the installation height of the rotation speed sensor 40 in the sensor dome 18. The final fixing of the rotation speed sensor 40 in the sensor dome 18 in terms of the protrusion dimension 86 can be achieved with infinite variation along the flutes 46 by injecting a fixing compound 68 through the injection opening 66. The fact that the free ends of the pressed screens 52 are embodied with an excess length assures that an electrical contact 76 between the protruding ends of the pressed screens 52 and the support plate pressed screen 70 of the support plate 10 is always produced in accordance with the individual assembly dimension 88 of the rotation speed sensor 40. The electrical contact 76 between the sensor element 40 and the support plate 10 can be an insulation displacement contact, as shown in FIGS. 5 and 7, and can also be an integrally joined connection 100 produced by means of laser welding or resistance welding, as shown in FIGS. 6 and 8.

FIG. 9 shows a tolerance that can be achieved with the design according to the invention.

By using the method according to the invention, it is possible to achieve an air gap L that is extremely precise in the installation of the rotation speed sensor 40, whether this is intended for detecting the drive shaft speed or the output shaft speed. By contrast with the tolerance chain that is depicted in FIG. 2 and is comprised of the tolerance 34, the length of the sensor 36, and the inevitable installation tolerance 38, the design according to the invention achieves an overall tolerance 39 during the installation process that depends solely on the tolerance of the assembly dimension 88. As a result, the air gap L between the rotation speed sensor 40 according to FIG. 9 and the outer circumference of the trigger wheel 32 can be produced in a significantly more precise fashion. By virtue of the flutes 46 and the fixing compound 68 injected between the sensor dome 18 and the outer circumference of the sensor element 40, the rotation speed sensor 40 can also be installed in the sensor dome 88 in an infinitely variable fashion. The sensor assembly dimension 88 can thus be selected so that an air gap L can be achieved, which is optimal with regard to the signal transmission between the trigger wheel 32 and the sensor element of the rotation speed sensor 40.

What is claimed is:

1. A method for mounting sensors (40) on a support plate (10) of a control module with the following method steps:
    a) the orientation and insertion of the sensor (40) into a sensor dome (18) of the support plate (10) in an installation direction (56),
    b) the adjustment of a sensor assembly dimension (88) with regard to a top surface (16) of the support plate (10),
    c) the production of a form-locked connection between the sensor (40) and the sensor dome (18) through the introduction of a fixing compound (68) into a cavity (64),
    d) the production of a form-locked or integrally joined sensor contact (76) between the sensor (40) and support plate contacts (70) during the insertion of the sensor (40) into the sensor dome (18) according to method step a).

2. The method as recited in claim 1,
    wherein according to method step c), the fixing compound (68) is injected into the cavity (64) that is delimited by a wall (58) of the sensor dome (18) and by a circumference surface of the sensor (40) that has flute-shaped raised areas (46).

3. The method as recited in claim 1,
    wherein an adhesive, a hot-melt glue, or an easily flowing plastic injection-molding compound is used as the fixing compound (68).

4. The method as recited in claim 1,
    wherein according to method step a), pressed screens (52) of the sensor (40) are centered by means of insertion bevels (74).

5. The method as recited in claim 1,
wherein according to method step d), the sensor contacting (76) is produced by means of an insulation displacement contact produced between a pressed screen (52) of the sensor (40) and contact tabs (94, 96) of support plate pressed screens (70) or by means of an integrally joined connection (100) between a bent end (102) of a support plate pressed screen (70) and a pressed screen (52) of the sensor (40).

6. The method as recited in claim 5,
wherein the integrally joined connection (100) is produced by means of laser welding or resistance welding.

7. The method as recited in claim 1,
wherein after production of the form-locked or integrally joined sensor contact (76) an excess length (78, 98) of pressed screen is cut off.

8. A support plate (10) for transmission control modules (92) for motor vehicles, having at least one sensor dome (18) in which a sensor (40) is installed in accordance with the method as recited in claim 1, wherein the sensor (40) has flute-shaped raised areas (46) let into a circumferential surface thereof and has pressed screens (52) that are embodied with a freely extending length (55) that exceeds a maximum assembly dimension (86, 88) of the sensor (40) with regard to the top surface (16) of the support plate (10).

9. The support plate as recited in claim 8,
wherein the flute-shaped raised areas (46) on the sensor (40) are situated in a region whose length in the axial direction of the sensor (40) corresponds to a protrusion dimension (86) of the sensor (40) beyond the sensor dome (18).

10. The support plate as recited in claim 8,
wherein this support plate includes extrusion-coated or inserted support plate pressed screens (70) that extend underneath openings (72) of the support plate (10), the fronts of which openings are provided with insertion bevels (74) for centering the pressed screens (52).

11. The support plate as recited in claim 10,
wherein a rib-shaped dividing piece (90) extends between the openings (72) for the pressed screens (52) of the sensor (40).

12. The support plate as recited in claim 8,
wherein the sensor (40) is a sensor that detects the drive shaft speed or output shaft speed of a motor vehicle transmission.

\* \* \* \* \*